(12) United States Patent
Kojima et al.

(10) Patent No.: US 7,766,427 B2
(45) Date of Patent: Aug. 3, 2010

(54) SEAT DEVICE FOR VEHICLE

(75) Inventors: Yasuhiro Kojima, Kariya (JP);
Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 241 days.

(21) Appl. No.: 11/856,249

(22) Filed: Sep. 17, 2007

(65) Prior Publication Data
US 2008/0079300 A1 Apr. 3, 2008

(30) Foreign Application Priority Data
Sep. 29, 2006 (JP) ............................. 2006-268666

(51) Int. Cl.
*A47C 1/00* (2006.01)
(52) U.S. Cl. .................. 297/344.15; 248/423
(58) Field of Classification Search ............ 297/344.15; 248/421, 423
See application file for complete search history.

(56) References Cited

U.S. PATENT DOCUMENTS

| | | | | |
|---|---|---|---|---|
| 3,455,417 A | * | 7/1969 | Takata | 188/71.8 |
| 4,371,207 A | * | 2/1983 | Wilking et al. | 297/344.15 |
| 5,882,061 A | * | 3/1999 | Guillouet | 296/65.05 |
| 6,502,799 B2 | * | 1/2003 | Lepaule | 248/423 |
| 6,572,065 B2 | * | 6/2003 | Koga et al. | 248/421 |
| 7,517,020 B2 | * | 4/2009 | Yokota | 297/344.15 |

FOREIGN PATENT DOCUMENTS

JP  2002-321551  11/2002

\* cited by examiner

*Primary Examiner*—Sarah B McPartlin
(74) *Attorney, Agent, or Firm*—Oblon, Spivak, McClelland, Maier & Neustadt, L.L.P.

(57) ABSTRACT

A seat device for a vehicle adapted to adjust a positional height of a seat cushion includes rails, frames supporting the seat cushion, link members, a torque rod connecting link members, a sector gear formed so as to operate together with one of the link members and rotatably supported by one of the frames, an elongated hole formed on the sector gear, a pinion gear meshing with the sector gear, a pressing bracket supported by the pinion gear, a stopper pin inserted into the elongated hole of the sector gear and connected to the one of the frames at a first end of the stopper pin and to the pressing bracket at a second end of the stopper pin.

17 Claims, 4 Drawing Sheets

SEAT DEVICE FOR VEHICLE

CROSS REFERENCE TO RELATED APPLICATIONS

This application is based on and claims priority under 35 U.S.C. §119 to Japanese Patent Application 2006-268666, filed on Sep. 29, 2006, the entire content of which is incorporated herein by reference.

FIELD OF THE INVENTION

The present invention relates to a seat device for a vehicle adapted to adjust a positional height of a seat cushion by operating an operation member such as an operation lever.

BACKGROUND

Generally, a seat device for a vehicle includes a lifting mechanism by which a positional height of the seat cushion can be adjusted. Specifically, when an occupant sitting on the seat operates an operation lever, the lifting mechanism is operated so that the positional height of the seat cushion is adjusted. The seat device having the abovementioned configuration is disclosed, for example, in JP2002-321551A.

As illustrated in FIG. 3 of JP2002-321551A, a front link 71 and a rear link 81 are provided between an upper rail 13 and a lower arm 20. Specifically, one end portion of the front link 71 is rotatably attached to a front portion of the upper rail 13 by means of a pin 72, and the other end portion of the front link 71 is rotatably attached to a front portion of the lower arm 20 by means of a pin 73. On the other hand, one end portion of the rear link 81 is rotatably attached at to rear portion of the upper rail 13 by means of a pin 82, and the other end portion of the rear link 81 is rotatably attached to a rear portion of the lower arm 20 by means of a pin 83. In this configuration, a four-link mechanism is formed with a combination of the upper rail 13, the front link 71, the lower arm 20 and the rear link 81, each connecting as mentioned above. By virtue of the four-link mechanism, the lower arm 20 is lifted up and down relative to the upper rail 13 by rotating the front link 71 or the rear link 81.

Further, a driven gear 91 (hereinafter referred to as a sector gear 91) meshing with a pinion gear 101 is rotatably attached to a central portion of the lower arm 20 by means of a pin 92, and the rear link 81 is indirectly connected to the sector gear 91 via a connecting link 95. Furthermore, an elongated hole 91a is formed on the sector gear 91 in a manner where it extends along a partial circumference of an imaginary circle formed relative to the pin 92. In this configuration, a pin 104 is inserted into the elongated hole 91a so as to be slidable in order to limit the rotation of the sector gear 91.

According to the seat device disclosed in JP2002-321551A having the abovementioned configuration, because the sector gear 91 is simply attached to the lower arm 20 by means of the pin 92, in other words, because the sector gear 91 is cantilevered by the lower arm 20 using the pin 91, when a load is applied to the vehicle from the outside due to, for example, a vehicle collision, a buckling deformation occurs at the lower arm 20, and then force in a front-rear direction of the vehicle is applied to a meshing portion between the sector gear 91 and a pinion gear 101, as a result, the pinion gear 101 may disengage from the sector gear 91 because of the load applied to the vehicle.

A need thus exists for a seat device which is not susceptible to the drawback mentioned above.

SUMMARY OF THE INVENTION

According to an aspect of the present invention, a seat device for a vehicle adapted to adjust a positional height of a seat cushion includes first and second rails provided on a vehicle floor, first and second frames supporting the seat cushion, first and second link members connecting the first and second frames to the first and second rails in a manner where the first and second frames are movable in a vertical direction, a torque rod connecting the first link member to the second link member, a sector gear formed so as to operate together with one of the first and second link members and rotatably supported by one of the first and second frames, an elongated hole formed on the sector gear so as to extend along a partial circumference of an imaginary circle formed relative to a rotational center point of the one of the first and second link members, a pinion gear rotatably supported by the one of the first and second frames and meshing with the sector gear, a pressing bracket supported by the pinion gear, and a stopper pin inserted into the elongated hole of the sector gear and connected to the one of the first and second frames at a first end of the stopper pin and to the pressing bracket at a second end of the stopper pin.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
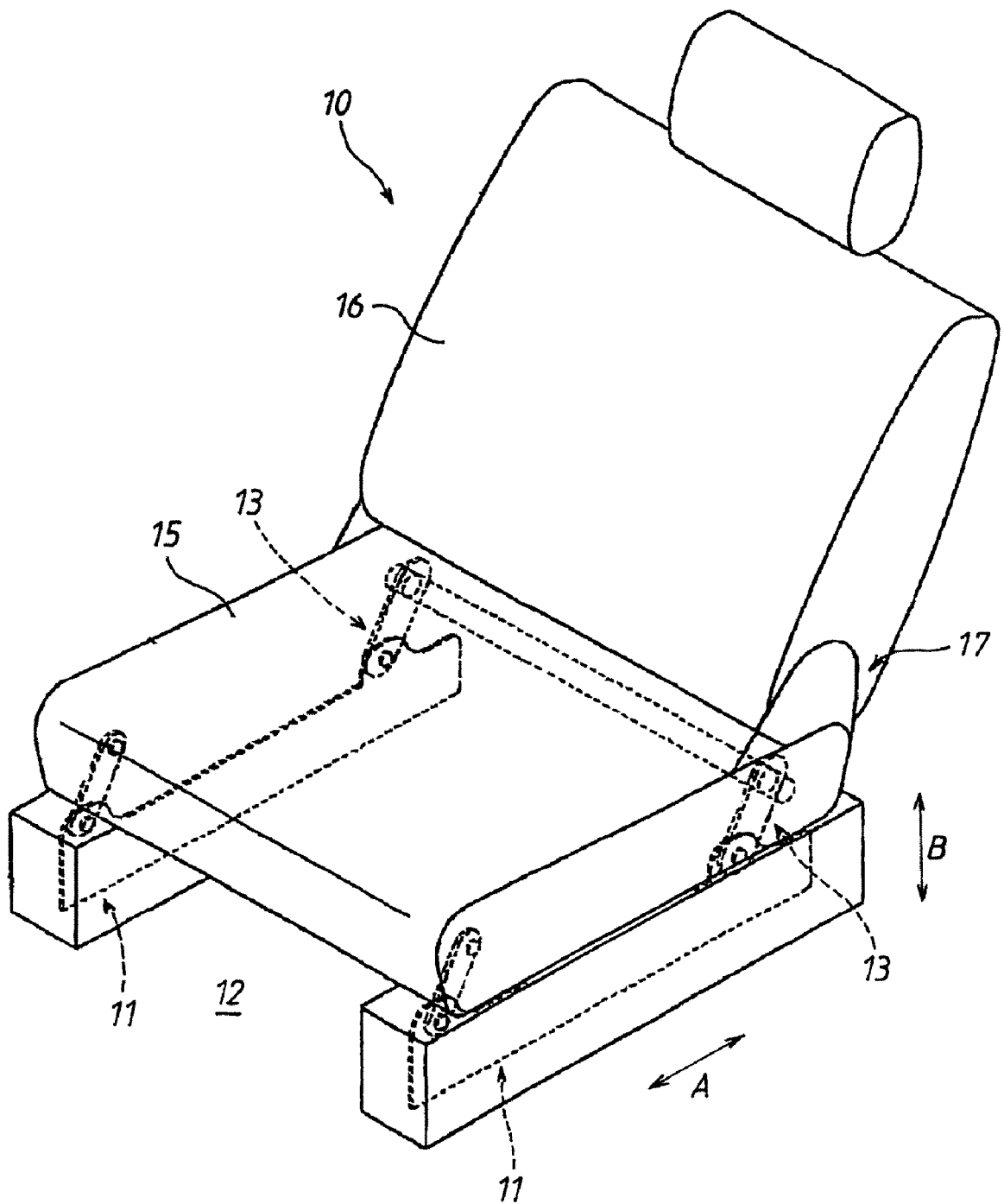
FIG. 1 illustrates an entire view of a seat device adapted to a vehicle according to the embodiment of the present invention.
Figure 2:
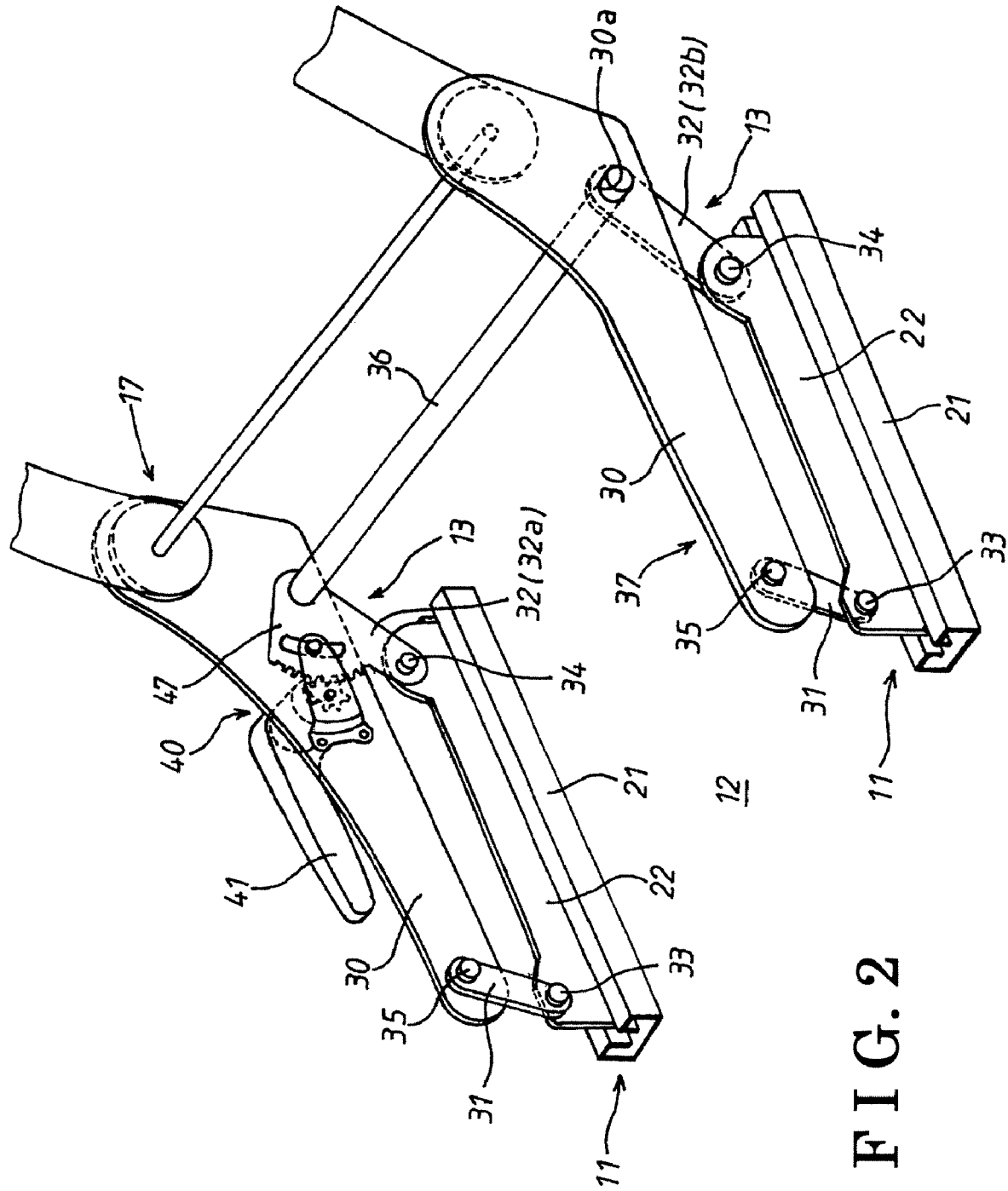
FIG. 2 illustrates an oblique perspective view indicating a configuration of the seat device.

An embodiment of the present invention will be explained in accordance with the attached drawings. In FIGS. 1 and 2, a seat device 10 adapted to a vehicle is mounted on a vehicle floor 12 by means of a seat sliding and adjusting apparatus 11. Specifically, the seat device 10 is mounted on the vehicle floor 12 so as to be slidable in a front-rear direction of the vehicle (in a direction indicated with an arrow A in FIG. 1) and movable in a vertical direction (in a direction indicated with an arrow B) relative to the vehicle floor 12. Further, the seat device 10 further includes a seat cushion 15 forming a seat surface of the seat and a seat back 16 forming a backrest of the seat. The seat back 16 is attached to a rear portion of the seat cushion 15 by means of a reclining apparatus 17, and the rotation of the seat back 16 is limited or allowed by means of the reclining apparatus 17. Specifically, by means of the reclining apparatus 17, the seat back 16 may pivot relative to the seat cushion 15 in a front-rear direction of the vehicle and can be maintained at a certain angle.

As illustrated in FIG. 2, the seat sliding and adjusting apparatus 11 includes a pair of lower rails 21, which is fixed on the vehicle floor 12, and a pair of upper rails 22. One of the lower rails 21 and one of the upper rails 22 (hereinafter referred to as a first lower rail 21 and a first upper rail 22) are provided at the right of the seat sliding and adjusting apparatus 11, and the other of the lower rails 21 and the other of the upper rails 22 (hereinafter referred to as a second lower rail 21 and a second upper rail 22) are provided at the left of the seat sliding and adjusting apparatus 11. Each first and second lower rail 21 is formed in a long shape having a U-shape cross section and extending in a front-rear direction of the vehicle (in a front-rear direction of the vehicle seat). Each first and second upper rail 22 is formed in a long shape having an inverted T-shape cross section and extending in a front-rear direction of the vehicle. The first upper rail 22 engages the first lower rail 21, and the second upper rail 22 engages the second lower rail 21, so as to be slidable in a front-rear direction of the vehicle and maintained at a certain position in a front-rear direction of the vehicle by means of a lock mechanism (not illustrated).

As illustrated in FIG. 2, the seat sliding and adjusting apparatus 11 further includes a seat lifting apparatus 13 including a pair of frames 30, a pair of front link members 31 and a pair of rear link members 32. Each rear link member 32 may simply be referred to as a link member. One of the frames 30, one of the front link members 31 and one of the rear link members 32 (hereinafter referred to as a first frame 30, a first front link member 31 and a first rear link member 32) are provided at the right of the seat sliding and adjusting apparatus 11. The other of the frames 30, the other of the front link member 31 and the other of the rear link members 32 (hereinafter referred to as a second frame 30, a second front link member 31 and a second rear link member 32) are provided at the left of the seat sliding and adjusting apparatus 11. In the embodiment, the first frame 30 is fixed to an outer side of the seat cushion 15, and the second frame 30 is fixed to an inner side of the seat cushion 15, however, the first frame 30 may be fixed to the inner side of the seat cushion 15, and the second frame 30 may be fixed to the outer side of the seat cushion 15. In this configuration, the first frame 30 is connected to the first upper rail 22 by means of the first front link member 31 and the first rear link member 32, and the second frame 30 is connected to the second upper rail 22 by means of the second front link member 31 and the second rear link member.

The first front link member 31 is rotatably connected to the first upper rail 22 at a lower end portion of the first front link member 31 so as to be rotatable by means of a hinge pin 33, and the second front link member 31 is rotatably connected to the second upper rail 22 at a lower end portion of the second front link member 31 so as to be rotatable by means of another hinge pin 33. The first rear link member 32 is rotatably connected to the first upper rail 22 at a lower end portion of the first rear link member 32 so as to be rotatable by means of a hinge pin 34, and the second rear link member 32 is rotatably connected to the second upper rail 22 at a lower end portion of the second rear link member 32 so as to be rotatable by means of another hinge pin 34. The first front link member 31 is rotatably connected to the first frame 30 at an upper end portion of the first front link member 31 so as to be rotatable by means of a hinge pin 35, and the second front link member 31 is rotatably connected to the second frame 30 at an upper end portion of the second front link member 31 so as to be rotatable by means of another hinge pin 35. An upper portion of the first rear link member 32 is integrally connected to a right end portion of a torque rod 36, and an upper portion of the second rear link member 32 is integrally connected to a left end portion of the torque rod 36. The torque rod 36 is made of pipe material and rotatably penetrates through a hole 30a formed on a rear portion of each of the right and left frames 30, respectively.

Figure 4:
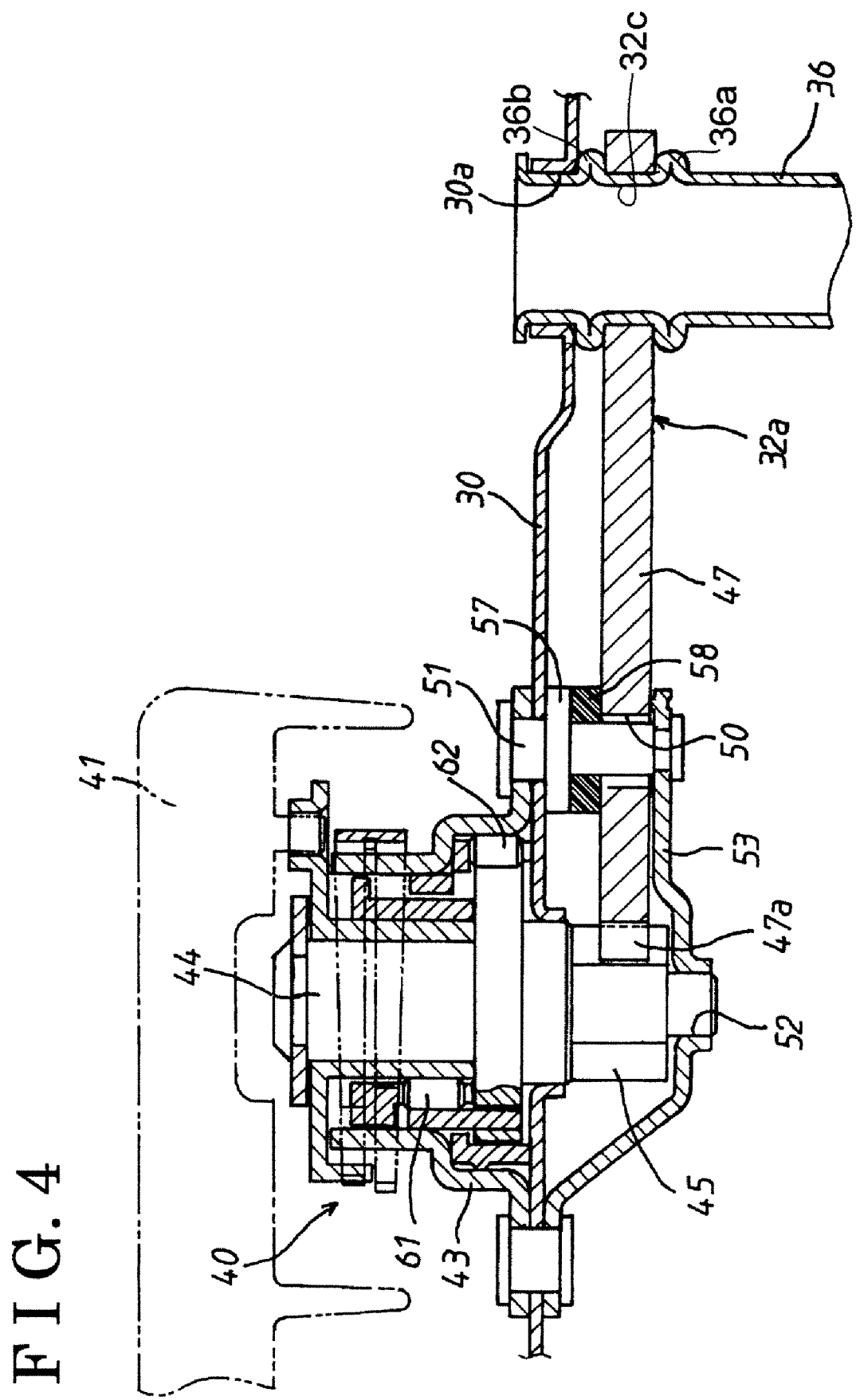
FIG. 4 illustrates a cross section of the seat height adjusting portion along a IV-IV line of FIG. 3.

Specifically, as illustrated in FIG. 4, on an upper portion of each first and second rear link member 32, a hole 32c is formed. In this embodiment, one end of the torque rod 36 is fit to the hole 32c formed on the first rear link member 32, and the other end of the torque rod 36 is fit to the hole 32c formed on the second rear link member 32. More specifically, the torque rod 36 is connected to the first and second rear link members 32 as follows. Firstly, one end portion of the torque rod 36 is inserted into the hole 32c formed on the first rear link member 32, and the other end portion of the torque rod 36 is inserted into the hole 32c formed on the second rear link member 32. Then, the torque rod 36 is pressed in an axial direction thereof so that protruding portions 36a and 36b are formed at each end of the torque rod 36 around each hole 32c as illustrated in FIG. 4. The protruding portions 36a and 36b are formed so as to protrude in a radial direction of the torque rod 36. Thus, the torque rod 36 is integrally connected to the first and second rear link members 32 in a manner where each of the first and second rear link members 32 is sandwiched between the protruding portions 36a and 36b.

In this embodiment, the first rear link member 32 forms a driving link member (32a) integrally having a sector gear 47, which will be explained later, and the second rear link member 32 forms a driven link member (32b) driven by means of the torque rod 36. The driving link member (32a) having the sector gear 47 may be formed at the second rear link member 32, and the driven link member (32b) may be formed at the first rear link member 32. Thus, a parallel link mechanism 37 (illustrated in FIG. 2) is composed of each first and second link member 31, each first and second rear link member 32, each first and second frame 30 and each first and second upper rail 22. In this configuration, once the first rear link member 32 (driving link member 32a) at which the sector gear 47 is formed is rotated, the parallel link mechanism 37 is operated so that the first and second frames 30 are moved in a vertical direction (in a direction indicated with the arrow B in FIG. 1) with keeping their postures horizontally.

Figure 3:
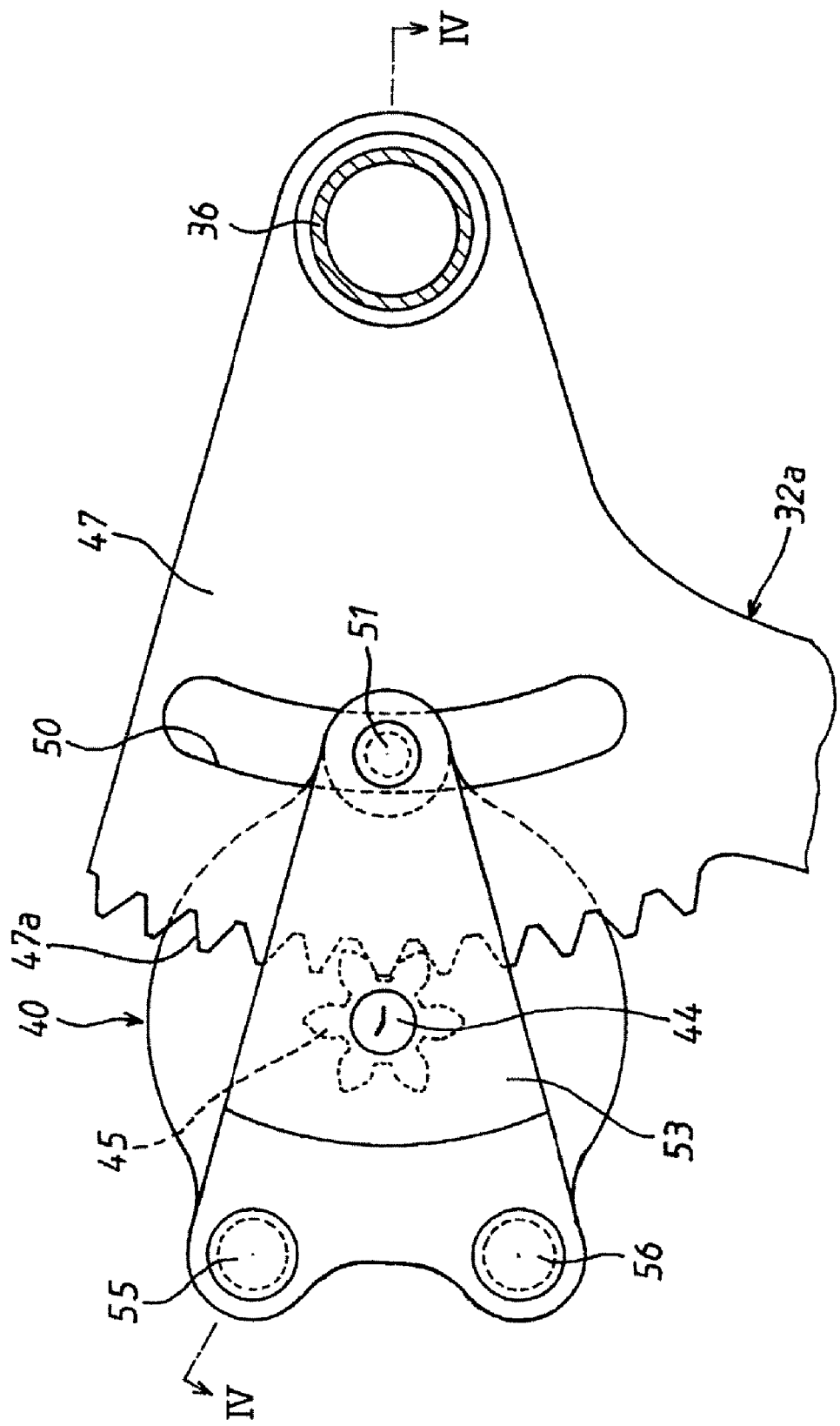
FIG. 3 illustrates a cross section indicating a configuration of a seat height adjusting portion.

A clutch mechanism 40, serving as a seat height adjusting portion, is attached to the first frame 30. The clutch mechanism 40 may be attached to the second frame 30. An operation lever 41, serving as an operating member, is connected to the clutch mechanism 40. As illustrated in FIG. 4, the clutch mechanism 40 includes a case 43, an output shaft 44 and a pinion gear 45. The case 43 is fixed to the first frame 30, the output shaft 44 is provided within the case 43 and rotatable by operating the operation lever 41, and the pinion gear 45 is provided at one end of the output shaft 44. As mentioned above, the sector gear 47 is formed on the first rear link member 32 (driving link member 32a). Specifically, as illustrated in FIG. 3, a gear teeth portion 47a is formed at an end portion of the sector gear 47 in a manner where the gear teeth portion 47a extends along a partial circumference of an imaginary circle formed relative to the torque rod 36. The gear teeth portion 47a meshes with the pinion gear 45 of the clutch mechanism 40.

In this configuration, the sector gear 47 is rotated in accordance with the rotation of the pinion gear 45, and further the driving link member 32a is rotated in accordance with the rotation of the sector gear 47. Furthermore, the rotation of the driving link member 32a is transmitted to the driven link member 32b by means of the torque, rod 36 so that the first and second frames 30 are moved in a vertical direction so that a positional height is adjusted to an appropriate position.

Further, as illustrated in FIGS. 3 and 4, on the sector gear 47, an elongated hole 50 is formed so as to extend along a partial circumference of an imaginary circle formed relative to the torque rod 36, the imaginary circle being smaller than the imaginary circle used for explaining the formation of the gear teeth portion 47a. A stopper pin 51 penetrates through the elongated hole 50 so as to be slidable in a longitudinal direction of the elongated hole 50. The stopper pin 51 further penetrates through the first frame 30 and the case 43 of the clutch mechanism 40 at one end portion of the stopper pin 51 and is fastened to the first frame 30 and to the case 43. In this configuration, the rotation of the sector gear 47 is regulated by means of the stopper pin 51. On the other hand, the other end of the stopper pin 51 is tightened to a pressing bracket 53. The pressing bracket 53 includes a bearing portion 52 by which the pinion bear 45 is rotatably supported at one end thereof. Specifically, as illustrated in FIG. 3, the pressing bracket 53 is integrally connected to the first frame 30 and the case 43 at two points by means of connecting pins 55 and 56, each of which penetrates through the first frame 30 and the case 43 of the clutch mechanism 40. The stopper pin 51 is provided at one end portion of the pressing bracket 53, and the connecting pins 55 and 56 are provided at the other end portion of the pressing bracket 53 relative to the pinion gear 45.

The stopper pin 51 is arranged on a imaginary straight line that connects the output shaft 44 of the clutch mechanism 40 (pinion gear 45) and the torque rod 36, and one end of the stopper pin 51 is connected to the first frame 30 and the other end of the stopper pin 51 is connected to the pressing bracket 53. Generally, when a vehicle collision occurs, and a buckling deformation occurs at both of/each of the first and second frames 30 so that a force is applied to the meshing part between the pinion gear 45 and the sector gear 47 in a front-rear direction of the vehicle, in other words a buckling deformation may occur at both of/each of the first and second frames 30 so that the sector gear 47 disengages from the pinion gear 45. However, according to the configuration of the embodiment, even when a vehicle collision occurs, the pinion gear 45 and the sector gear 47 are prevented from being disengaged from each other.

As illustrated in FIG. 4, on a circumferential surface of the stopper pin 51, a flange portion 57 is formed so as to protrude in a radial direction of the stopper pin 51, and an elastic member 58 is fit to the stopper pin 51 and positioned between the flange portion 57 and the sector gear 47. The elastic member 58 is made of resin or rubber and is formed in a ring shape so as to fit the stopper pin 51. Because of the elastic member 58, when the sector gear 47 is operated, a certain amount of slide resistance is applied to the sector gear 47 so that a rapid impact or a small vibration force applied to the clutch mechanism 40 may be reduced.

The clutch mechanism 40 forming the seat height adjusting portion has a known configuration. For example, the clutch mechanism 40 includes: a first clutch member for transmitting rotations generated by operating the operation lever 41 in one direction or the other direction to the output shaft 44 (pinion gear 45) via a first roller 61 and a second roller 62; and a second clutch member for regulating the rotation of the output shaft 44 after the operation lever 41 is operated. Detailed explanation of the known configuration of the clutch mechanism 40 will be omitted here.

An operation of the seat apparatus 10 according to the embodiment will be explained. When the operation lever 41 is operated in order to move the seat cushion 15 in, for example, an upward direction, the output shaft 44 is rotated in one direction by means of the clutch mechanism 40, and then the sector gear 47 meshing with the pinion gear 45 is rotated relative to the torque rod 36 together with the driving link member 32a in an anticlockwise direction in FIG. 2. An operation of the driving link member 32a is transmitted to the driven link member 32b through the torque rod 36, as a result, the seat cushion 15 is moved in an upward direction together with the first and second frames 30. At this point, the amount of the upward movement of the seat cushion 15, in other words a rotation amount of the sector gear 47, is regulated by means of the stopper pin 51 engaging with the elongated hole 50 at one end thereof.

When the operation lever 41 is released, the output shaft 44 is biased to rotate in the other direction due to weight of the vehicle seat and weight of an occupant, however, the rotation of the output shaft 44 can be stopped by means of the second clutch member of the clutch mechanism 41. Once the operation lever 41 is released, because a biasing force is applied by a spring (not illustrated) to the operation lever 41, the operation lever 41 can be restored to its original position (a neutral position).

When the operation lever 41 is operated in order to move the seat cushion 15 in, for example, a downward direction, the output shaft 44 is rotated in the other direction by means of the clutch mechanism 40, and the sector gear 47 meshing with the gear 45 is rotated relative to the torque rod 36 in a clockwise direction in FIG. 2, as a result, the seat cushion 15 is moved downward together with the first and second frames 30. At this point, the amount of the rotation of the sector gear 47 (the amount of the movement of the seat cushion 15 in a downward direction) is regulated by means of the stopper pin 51 engaging with the elongated hole 50 at the other end thereof.

Because the stopper pin 51 inserted into the elongated hole 50 is supported by the first frame 30 at one end of the stopper pin 51 and also supported by the pressing bracket 53 at the other end of the stopper pin 51, the pressing bracket 53 being integrally connected to the first frame 30, the stopper pin 51 is supported with high rigidity at a position distanced at a certain amount from an axial center of the pinion gear 45. In this configuration, each of the first frame 30 and the pressing bracket 53 can achieve a high resistance against the deformation thereat in a front-rear direction of the vehicle caused by buckling deformation that occurs at both of/each of the first and second frames 30. Thus, even when a vehicle collision occurs, and a force in a front-rear direction of the vehicle is applied of the meshing part between the pinion gear 45 and the sector gear 47, the pinion gear 45 and the sector gear 47 are prevented from being disengaged from each other.

According to the embodiment of the present invention, the clutch mechanism 40 includes: the sector gear 47 formed at one side of the rear link member 32 and having the elongated hole 50 formed in a manner where it extends along a partial circumference of an imaginary circle formed relative to the torque rod 36; the pinion gear 45 rotatably supported by the first frame 30 and meshing with the sector gear 47; the pressing bracket 53 supported by the pinion gear 45; and the stopper pin 51 penetrating through the elongated hole 50 of the sector gear 47 and connected to the frame 30 at one end of the stopper pin 51 and connected to the pressing bracket 53 at the other end of the stopper pin 51. In this configuration, because the stopper pin 51 is supported by the first frame 30 and the pressing bracket 53 being integrally connected to the first frame 30 at both end portions of the stopper pin 51, even when a vehicle collision occurs, and buckling deformation is generated at the first frame 30, the pinion gear 45 and the sector gear 47 are prevented from being disengaged from each other.

According to the embodiment of the present invention, because the stopper pin 51 is aligned on the imaginary line connecting a rotational center point of the sector gear 47 and a rotational center point of the pinion gear 45, even when buckling deformation is generated at the first frame 30, and the force is applied to the meshing part between the pinion gear 45 and the sector gear 47 in a front-rear direction of the vehicle, a moment that acts so as to disengage the pinion gear 45 and the sector gear 47 from each other is not generated, as a result, the meshing between the sector gear 45 and the pinion gear 47 is appropriately maintained.

According to the embodiment of the present invention, the elastic member 58 made of resin or rubber and formed in a ring-shape is provided between the flange portion 57 formed on the stopper pin 51 and the sector gear 47 in order to apply the slide resistance to the sector gear 47 when the sector gear 47 is rotated. Thus, by simply providing the elastic member 58 at the stopper pin 51, a rapid impact or a small vibration force applied to the clutch mechanism 40 may be reduced.

According to the embodiment of the present invention, the torque rod 36 is made of pipe material, and one end of the torque rod 36 is deformed so as to be integrally connected to the first link member 32, and the other end of the torque rod 36 is deformed so as to be integrally connected to the second link member 32. Thus, the torque rod 36 is firmly connected to the first and second link members 32 with a simple structure, further reducing the weight of the seat device.

According to the embodiment of the present invention, the sector gear is connected so as to be integral with the first link member, the number of parts forming the clutch mechanism can be reduced.

According to the embodiment of the present invention, the torque rod 36 is connected to the first link member 32 to which the sector gear 47 having the elongated hole 50 is integrally formed, however, as disclosed in JP2002-321551A, the sector gear and the link member are provided separately, and such sector gear may be connected to the link member by means of a driving link.

According to the embodiment of the present invention, the elastic member 58 formed in a ring-shape in order to apply slide resistance to the sector gear 47 is provided between the flange portion 57 formed on the stopper pin 51 and on an end surface of the sector gear 47, however, the elastic member 58 may be positioned between the end surface of the sector gear 47 and an end surface of the first frame 30. In this configuration, a same effect may be obtained.

The structure and configuration of the clutch mechanism 40 is not limited as described in the embodiment of the present invention. The configuration of the clutch mechanism 40 may be modified as long as it has the above mentioned functions. According to the embodiment of the present invention, the clutch mechanism 40 is applied to the first frame 30, however, it may be provided to the second frame 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive, Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat device for a vehicle to adjust a positional height of a seat cushion, the device comprising:
   first and second rails provided on a vehicle floor;
   first and second frames to support the seat cushion;
   first and second link members connecting the first and second frames to the first and second rails such that the first and second frames are movable in a vertical direction;
   a torque rod connecting the first link member to the second link member;
   a sector gear operating together with one of the first and second link members and rotatably supported by one of the first and second frames;
   an elongated hole formed on the sector gear and extending along a partial circumference of an imaginary circle formed relative to a rotational center point of the one of the first and second link members;
   a pinion gear rotatably supported by the one of the first and second frames and meshing with the sector gear;
   a pressing bracket supported by the pinion gear;
   a stopper pin inserted into the elongated hole of the sector gear and penetrating an opening formed in the one of the first and second frames at a first end of the stopper pin and penetrating an opening formed in the pressing bracket at a second end of the stopper pin; and
   an elastic member applying slide resistance to the sector gear when the sector gear is rotated.

2. The seat device according to claim 1, wherein the stopper pin is collinear with a rotational center point of the sector gear and a rotational center point of the pinion gear.

3. The seat device according to claim 2, wherein the sector gear is integrally formed with the one of the first and second link members.

4. The seat device according to claim 2, wherein the torque rod is made of pipe material and deformed at each end portion thereof so that one end portion of the torque rod is integrally connected to the first link member, and the other end portion of the torque rod is integrally connected to the second link member.

5. The seat device according to claim 4, wherein a plurality of projecting portions is formed at each end of the torque rod by applying pressing force thereto, and the torque rod is integrally connected to the first and second link members such that the first link member is sandwiched between the projecting portions formed at one end of the torque rod, and the second link member is sandwiched between the projecting portions formed at the other end of the torque rod.

6. The seat device according to claim 1, wherein the elastic member is provided between a flange portion formed on the stopper pin and the sector gear.

7. The seat device according to claim 6, wherein the torque rod is made of pipe material and deformed at each end portion thereof so that one end portion of the torque rod is integrally connected to the first link member, and the other end portion of the torque rod is integrally connected to the second link member.

8. The seat device according to claim 7, wherein a plurality of projecting portions is formed at each end of the torque rod by applying pressing force thereto, and the torque rod is integrally connected to the first and second link members such that the first link member is sandwiched between the projecting portions formed at one end of the torque rod, and the second link member is sandwiched between the projecting portions formed at the other end of the torque rod.

9. The seat device according to claim 6, wherein the flange portion is formed on a circumferential surface of the stopper pin so as to extend in a radial direction of the stopper pin.

10. The seat device according to claim 6, wherein the sector gear is integrally formed with the one of the first and second link members.

11. The seat device according to claim 1, wherein the sector gear is integrally formed with the one of the first and second link members.

12. The seat device according to claim 11, wherein
the torque rod is made of pipe material and deformed at each end portion thereof so that one end portion of the torque rod is integrally connected to the first link member, and the other end portion of the torque rod is integrally connected to the second link member.

13. The seat device according to claim 12, wherein
a plurality of projecting portions is formed at each end of the torque rod by applying pressing force thereto, and the torque rod is integrally connected to the first and second link members such that the first link member is sandwiched between the projecting portions formed at one end of the torque rod, and the second link member is sandwiched between the projecting portions formed at the other end of the torque rod.

14. The seat device according to claim 1, wherein
the torque rod is made of pipe material and deformed at each end portion thereof so that one end portion of the torque rod is integrally connected to the first link member, and the other end portion of the torque rod is integrally connected to the second link member.

15. The seat device according to claim 14, wherein
a plurality of projecting portions is formed at each end of the torque rod by applying pressing force thereto, and the torque rod is integrally connected to the first and second link members such that the first link member is sandwiched between the projecting portions formed at one end of the torque rod, and the second link member is sandwiched between the projecting portions formed at the other end of the torque rod.

16. The seat device according to claim 1, further comprising:
an operating member coupled to the pinion gear; and
a clutch mechanism arranged between the operating member and the pinion gear.

17. The seat device according to claim 1, wherein the pressing bracket is integrally connected to the one of the first and second frames.

* * * * *